United States Patent [19]

Aleck

[11] Patent Number: 4,611,837
[45] Date of Patent: Sep. 16, 1986

[54] TUBULAR ELEMENT COUPLING MEANS

[75] Inventor: Benjamin J. Aleck, Jackson Heights, N.Y.

[73] Assignee: Grumann Aerospace Corporation, Bethpage, N.Y.

[21] Appl. No.: 633,575

[22] Filed: Jul. 23, 1984

[51] Int. Cl.⁴ ............................................. F16L 37/14
[52] U.S. Cl. .................................. 285/305; 285/321; 285/328
[58] Field of Search ............... 285/305, 328, 321, 394, 285/358; 403/341, 350

[56] References Cited

U.S. PATENT DOCUMENTS

| | | |
|---|---|---|
| 2,616,587 | 11/1952 | Petch . |
| 2,687,910 | 8/1954 | Petch et al. . |
| 2,734,762 | 2/1956 | Aleck . |
| 2,746,775 | 5/1956 | Leonard . |
| 2,749,154 | 6/1956 | Smith . |
| 2,812,958 | 11/1957 | Rogers ............................ 285/321 X |
| 2,835,170 | 5/1958 | Kindelberger . |
| 2,877,732 | 3/1959 | Eaton . |
| 2,936,625 | 5/1960 | Heiseler ........................... 403/314 X |
| 2,952,480 | 9/1960 | Prill et al. . |
| 3,039,649 | 6/1962 | Aleck . |
| 3,142,498 | 7/1964 | Press ................................. 285/305 X |
| 3,167,331 | 1/1965 | Marshall . |
| 3,195,934 | 7/1965 | Parrish . |
| 3,457,861 | 7/1969 | Crockett . |
| 3,811,716 | 5/1974 | Morzynski . |
| 4,281,601 | 8/1981 | Overman ............................ 285/321 |
| 4,426,105 | 1/1984 | Plaquin et al. ....................... 285/321 |
| 4,427,221 | 1/1984 | Slay, Jr. ............................. 285/305 |

FOREIGN PATENT DOCUMENTS

| | | | |
|---|---|---|---|
| 485139 | 12/1975 | Australia ............................. 285/321 |
| 1310712 | 10/1962 | France ................................. 285/305 |
| 1030984 | 5/1966 | United Kingdom ................... 285/305 |

Primary Examiner—Thomas F. Callaghan
Attorney, Agent, or Firm—Richard G. Geib

[57] ABSTRACT

A readily assembled and disassembled coupling designed to sustain both axial and torsional loads. The coupling has two tubular elements that are held together by a locking ring inserted from outside the coupling after the connection is made. The end of the first tubular element fits into a section of enlarged diameter in the end of the second tubular element. The shoulder in the bore of the second at the transition point between the enlarged and normal diameter is formed into a helix. A matching helix is formed on the edge at the end of the first element. A peripheral annular groove is provided in the outer diameter of the first element and a similar groove is provided in the inside diameter of the second element. When the two elements are fitted together with their helices in contact to make the connection, the groove in the second element overlies the groove in the first element. A slot in the wall of the second element provides access to the grooves to permit the insertion of the locking ring.

9 Claims, 6 Drawing Figures

TUBULAR ELEMENT COUPLING MEANS

BACKGROUND OF THE INVENTION

1. Field Of The Invention

This invention relates to coupling means for tubular elements and, ore particularly, to a readily detachable coupling capable of taking axial and torsional loads.

2. Background Of The Invention

The prior art shows a great variety of couplings for making a readily attached and detached connection between tubular elements. Because of their convenience, various types of snap ring or ring-type key connections have become popular for such couplings. Usually such constructions employ opposed annular grooves in overlapping portions of the elements being joined and the ring or key adapted, when the coupling is assembled, to extend into the grooves and thereby lock one element in position with the other. Although such an arrangement usually makes a satisfactory coupling when axial loads on the coupling are involved, they leave much to be desired when the coupling is subjected to torque loads.

When the coupling is required to withstand torque as well as axial loads, a threaded connection is generally employed. To reduce the number of turns required to engage a large number of threads and also to provide a seal for pressurized fluids when a threaded connection is used with tubes or pipes conveying fluids, pipe threads are used instead of machine threads. In some threaded connection designs, a shoulder is incorporated on one of the elements of the connection to act as a jam nut. When the other element of the connection is tightened against the shoulder, the "play" is taken out of the joint and the bending rigidity of the coupling is increased. Threaded connections have a number of drawbacks that tend to limit their usefulness. The principal disadvantages of conventional threaded connections include the following: the loads on the joints are statically indeterminate and minute dimensional variations in the threads can produce large variations in the load distribution on the threads; threads are inherently structurally weak in comparison with the tubes or pipes in which they are formed and are hence subject to high stresses and stress concentrations; threads are easily damaged by rough handling; and for critical applications, the inspecting of new or renewed threads is difficult and expensive. In addition, threaded joints are unidirectional and a torque in the wrong direction tends to unscrew the connection. On the other hand, excessive torque loads in the thread direction has a tendency to jam the connection. In addition, threaded connections normally require the use of tools to make and break the coupling.

DESCRIPTION OF THE PRIOR ART

The prior art discloses a number of couplings using annular ring and groove connections. A more or less conventional snap ring arrangement in which the user compresses the diameter of the ring with a tool to install it into a groove in one element to retain a second element is disclosed by S. R. Crockett in U.S. Pat. No. 3,457,861. Other designs in which the coupling incorporates integral means to force the snap ring or key arrangement into the grooves of the elements being joined are disclosed by C. L. Petch, U.S. Pat. No. 2,616,587; C. L. Petch et al., U.S. Pat. No. 2,687,910; G. H. Leonard, U.S. Pat. No. 2,746,775; F. N. Eaton, U.S. Pat. No. 2,877,732; and S. Morzynski, U.S. Pat. No. 3,811,716. The couplings disclosed in this enumerated prior art function to take primarily axial loads and they are not designed with torsional loads in mind.

A ring and groove type coupling that is designed to take torsional as well as axial loads is taught in the prior art by W. K. Prill et al, in U.S. Pat. No. 2,952,480. In the design a helical ring or key is threaded into opposing circumferential annular grooves in the coupling elements by twisting one of the elements of the connection relative to the other until the ring is fed into the grooves. Further twisting in the same direction causes the two elements to rotate with respect to one another to set their relative position. In operation, friction will cause the two elements to rotate together if the remote element is not restrained. However, if the coupling is subjected to a torque in the opposite direction, the helical ring is fed out of the grooves and the two elements will come apart.

SUMMARY OF THE INVENTION

This invention is a readily assembled and disassembled coupling for tubular elements. The coupling comprises two tubular elements and a locking ring or key for use therewith. The first tubular element has an end portion which is a sliding fit into an enlarged diameter in the end portion of the second tubular element. The enlarged diameter in the second element terminates in a shoulder in its bore. A spiral ramp or helix is provided on the shoulder and a matching ramp or helix also on the full thickness of the end portion of the first element. A peripheral annular groove is cut into the outer surface of the first element axially displaced a distance from its helical end and a peripheral annular groove of the same width and depth is cut into the inner surface of the second element displaced axially the same distance from the helical shoulder. A slot is pierced through the wall of the second element to provide access to the annular groove therein.

In this design, when the end of the first element is inserted into the end portion of the second element with the full length of the helix on the end of the first element in contact with the full length of the helix of the shoulder in the second element, the peripheral annular grooves in the elements substantially overlie one another. With the coupling thus aligned, an end of the arcuate key or split locking ring is inserted through the slot in the second element and into the overlying grooves. The split ring is fed into the grooves until the ring is positioned therein around substantially the circumference of the grooves. The outer end of the split ring is accessible through the slot so that the end of the ring can be grasped by pliers or a similar tool such that the ring can be withdrawn to allow the coupling elements to be separated.

The connection is completed when the split ring is installed. Any clearance or looseness existing in the connection is eliminated simply by rotating one element of the coupling with respect to the other in a direction opposite the pitch of the helices. When this is done, the helix of the first element rides up on the helix of the second element, forcing the elements apart axially. This axial movement causes the split ring to bottom against the sides of the groove to thereby tighten the connection. To uncouple the connection, one element is turned relative to the other element back to the starting position. This loosens the split ring to allow it to be removed such that the elements can be separated.

The present invention achieves the benefits of a conventional shouldered threaded joint in its ability to provide a coupling stiff in flexure, strong under either axial tensile or compressive loads and also strong in carrying torsional loads.

In addition, the design of my invention results in a coupling whose components are inherently more rugged and capable of more straightforward design, minimizing inspection requirements, especially upon reuse. In the event of damage, the design lends itself to easy repair even in the field. Under reverse torque the rigidity of the joint is readily overcome and the joint can be quickly and conveniently disassembled. However, even in the loose condition, the design permits the joint to carry considerable reverse torque.

It is thus a principal object of this invention to provide a coupling that is readily assembled or disassembled using only a simple tool such as pliers and yet the coupling will take both axial and torsional loads efficiently.

It is a further object of this invention to provide a coupling in which the length of the elements devoted to the connection are minimized and yet which provides a large bearing area for torque and axial loads.

It is another object of this invention to provide a coupling in which it is possible to statically determine the load on the coupling ring or key and in which it is possible to adjust the load thereon.

Yet another object of this invention is to provide a coupling whose design permits it to be conveniently adjusted at any time to tighten the connection.

Other objects and advantages of the invention will become apparent from a reading of the Specification and a study of the accompanying drawings.

DESCRIPTION OF THE DRAWINGS

For the purpose of illustrating the invention, there is shown in the drawings the forms which are presently preferred; however, it should be understood that the invention is not necessarily limited to the precise arrangements and instrumentalities here shown.

DESCRIPTION OF THE PREFERRED EMBODIMENTS

Figure 1:
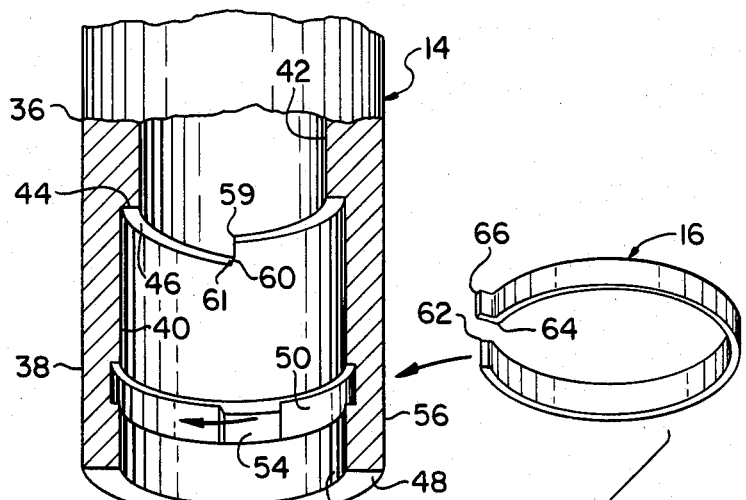
FIG. 1 is an exploded perspective view partially in section of the elements of the coupling of the invention and the locking ring or key used therewith with the elements tilted such that the upper element is viewed from slightly underneath and the lower element from slightly above.

Having now more particular reference to the drawings, the figures illustrate the coupling 10 of the invention. As perhaps best shown in FIGS. 1 and 2, the coupling 10 comprises a first element 12, a second element 14, and a locking ring or key 16 used therewith. Preferably, the elements have a tubular cylindrical configuration but, with obvious modifications, other configurations or even cylindrical solid elements can be connected with the coupling of the invention. In the preferred embodiment, first element 12 has a tubular cylindrical body 18 with a coupling end portion 20 having a helix 22 formed in its terminal edge 24. Axially inwardly of the helical end of the element, a peripheral annular groove 26 is provided in the outer surface 28 of the element. If the coupling is to be used for elements conveying fluids, a sealing means 30 can be provided intermediate the helical end 22 and the groove 26. Typically, sealing means 30 can be an O-ring 32 retained in peripheral annular groove 34 in outer surface 28 of the first element 12.

Second element 14 has a tubular cylindrical body 36 with a coupling end portion 38 having a section 40 of enlarged diameter in the bore 42 of the element. The diameter of section 40 is sized to provide a sliding fit for end portion 20 of the first element. Section 40 terminates in an annular shoulder 44 in the bore 42, which shoulder is formed into a helix 46 having a pitch that is identical when in the coupled position to that of helix 22. Intermediate the helix 46 and the end 48 of the second element 14, a peripheral annular groove 50 is provided in the inside surface 52 of section 40. A slot 54 in the wall 56 of the second element provides access to groove 50 from the outside of the element.

Figure 2:
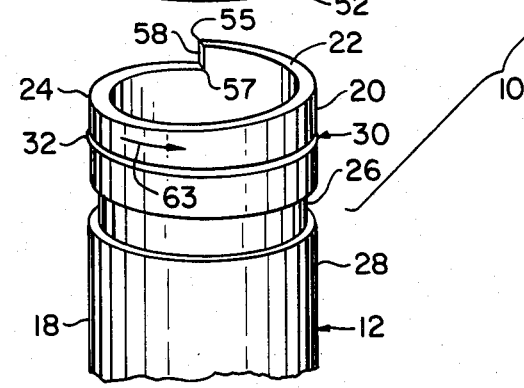
FIG. 2 is a longitudinal sectional view of the coupling embodied in the invention.
Figure 2:
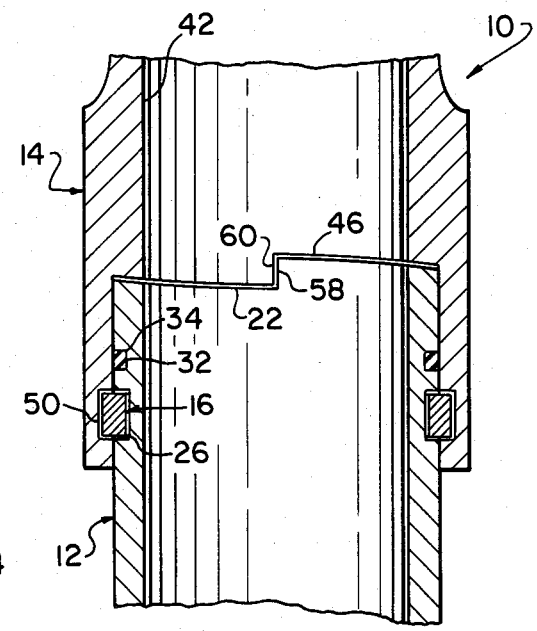
Figure 3:
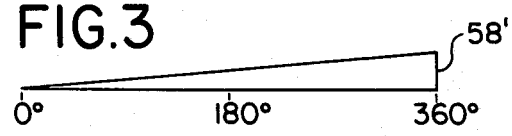
FIG. 3 is a schematic developed view of a preferred embodiment of the helix used in the coupling of the invention.
Figure 4:
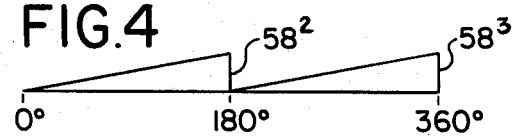
FIG. 4 is a schematic developed view of an alternative helix embodied in the invention.

In this coupling, the helix angle of the helices 22 and 46 is typically 1°. Other helix angles can be used consistent with the space available for the coupling. Also, the helix angle has to be selected such that the mechanical advantage furnished thereby does not overstress the component parts when the coupling is assembled and tightened as will be described subsequently. A single helix as indicated in FIGS. 1-3 can be employed or it may be advantageous to use a double helix as indicated in FIG. 4. It will be appreciated that the profile generated by the helix will result in an axially extending shoulder or shank at the end of the helix at the lead extending axially to the point of origin. Thus, helix 22 will have a shank 58 extending axially from its lead 55 to its point of origin 57 and helix 46 will have shank 60 extending axially from its lead 59 to its point of origin 61. As indicated by directional arrow 63, the helix advances from its point of origin to its lead. In the single helix developed in FIG. 3, therefore, there will be a single shank $58^1$ and the double helix developed in FIG. 4 will have two shanks $58^2$ and $58^3$. Although only single and double helices are shown, it will be recognized that the coupling can employ a greater number of helices if the requirements so dictate.

Figure 6:
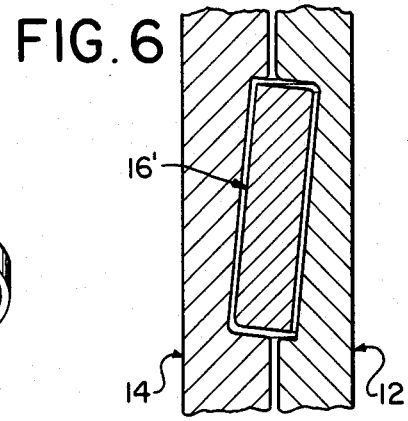
FIG. 6 is a cross-sectional view showing an alternate locking ring embodied in the invention.
Figure 5:
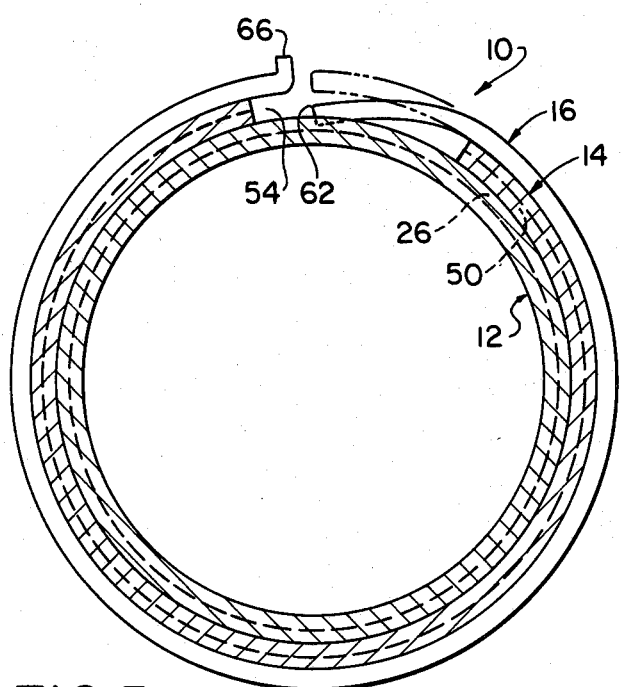
FIG. 5 is a cross-sectional view showing the installation of the locking ring or key into the coupling of the invention.

In operation, to make a connection, the coupling end portion 20 of first element 12 is inserted into coupling end portion 38 of element 14 to bring helix 22 into contact with helix 46. One element is rotated relative to the other to bring shank 58 of element 12 into contact with shank 60 of element 14. In this condition, as indicated in FIG. 2, the design is such that the annular groove 50 in element 14 substantially overlies annular groove 26 in element 12. With the elements so aligned, an end 62 of the locking ring or key 16 is inserted into the grooves through slot 54 in the outer wall of element 14 (see FIG. 5). Inasmuch as the ring 16 is preferably of a resilient, high-strength material, insertion of the ring is facilitated if the ring is first positioned around the outside of element 14, as also indicated in FIG. 5. Using a pliers or other suitable tool, the balance of ring 16 is fed into the overlying grooves. This design does not require a close tolerance fit between components to obtain a tight connection, thus loose fitting components can be used and ring insertion will not present any difficulties. When ring 16 is installed, its after end 64 is accessible from outside the coupling through slot 54. A flange 66 or other suitable means can be provided in after end 64 such that the ring can be grasped thereby when it is desired to withdraw the ring to disassemble the coupling. Installing the locking ring 16, locks element 12 to element 14. A locking ring 16 of rectangular cross-section is shown in FIGS. 1, 2 and 5, but it will be recognized that rings or keys of other cross-sectional configuration such as ring $16^1$ shown in FIG. 6 can be utilized advantageously in this invention. Ring $16^1$ which follows the teachings of U.S. Pat. No. 2,734,762 granted to the inventor also in the present invention behaves essentially as a column in transmitting the forces involved in forming the coupling between the retained and retaining elements.

It will be seen that tensile axial loads on the coupling are reacted by the ring against the shoulders of the grooves in each element. Should a torsional load be imposed by one element on the other element in a direction that brings the helix shank of the driving element against the helix shank of the driven element, a solid, high-strength connection is established for transmitting the torsional load. Should the torsional load be in a direction tending to separate the helix shank of the driving element from the helix shank of the driven element, the camming action of one helix riding up on the other helix causes a relative axial movement of one element with respect to the other. As discussed above, axial loads are reacted by the locking ring. After the clearances between the element grooves and the locking ring are taken up by the relative axial movement of the elements, the solid connection of the elements through the ring permit torsional loads in that direction also to be transmitted. Taking up the split ring clearance by twisting one element relative to the other bottoms the ring against the sides of the grooves to lock the coupling securely such that it achieves exceptional rigidity in bending. It will also be recognized that in this coupling, helix 22 of element 12 is always in secure physical contact with helix 46 of element 14, consequently, this coupling very efficiently transmits columnar or axial compression loads. To disassemble the connection when the coupling is in the tightened condition, one of the elements is twisted with respect to the other to bring the shanks of their respective helices back to their starting position in contact with one another. This action loosens or frees the split locking ring, permitting it to be withdrawn to break the connection.

Because of the design principles embodied in this invention, not only is it useful in applications where the loading, if any, is purely axial, but for use where torsional loads in either direction are involved. This characteristic makes the coupling valuable for connecting drill pipe in oil field operations and the like. The use of ring-type keys is common in solid-propellant rocket technology to hold a closure or rocket-nozzle onto the rocket motor case. Because the coupling of this invention can take torsional loads, unlike the prior art ring-type key couplings, it can be used advantageously in gun-fired rocket projectiles. The rigidizing or tightening of the coupling by bottoming the split ring against the sides of the grooves by a prior twist avoids destructive shocks in rocket and torpedo applications from a suddenly applied thrust which would tend to axially separate one element with respect to the other.

Although shown and described in what are believed to be the most practical and preferred embodiments, it is apparent that departures from the specific methods and designs described and shown will suggest themselves to those skilled in the art and may be made without departing from the spirit and scope of the invention. I, therefore, do not wish to restrict myself to the particular constructions described and illustrated, but desire to avail myself of all modifications that may fall within the scope of the appended claims.

Having thus described my invention, what I claim is:

1. A coupling for tubular elements, said coupling taking axial and torsional loads, comprising: a first coupling element the end portion of which is received in the end portion of a second coupling element, a helix in said end portion in each of said elements, a first annular peripheral groove in the outside diameter of said first element end portion, a second annular peripheral groove in the inside diameter of said second element end portion, a slot through the wall of said second element providing access to said second groove, and a split locking ring, wherein, when said first element end portion is received into said second element end portion with the first element helix in contact with said second element helix, said first annular groove is overlain by said second groove, whereby said locking ring is fed through said slot into said grooves to couple said elements together such that said ring reacts axial tension forces and said helices transmit torsional forces and axial compression forces, the relative rotation of said helices with respect to one another serving to load said locking ring axially to tighten said coupling, and wherein said locking ring has means permitting it to be withdrawn from said grooves through said slot such that said element can be uncoupled.

2. A coupling for taking axial and torsional loads comprising: a first coupling element the end portion of which is received in the end portion of a second coupling element, a helix in said end portion in each of said elements, each helix having an axially extending shank between the end of the helix at its lead and its point of origin, a first annular peripheral groove in the outside diameter of said first element end portion, a second annular peripheral groove in the inside diameter of said second element end portion, a slot through the wall of said second element providing access to said second groove, and a split locking ring having an outside diameter having a clearance fit with the diameter of the bottom of said second groove and a thickness less than the combined depths of said first and said second grooves, wherein, when said first element end portion is received into said second element end portion with the first element helix in contact with said second element helix, said first annular groove is overlain by said second annular groove such that said locking ring can be fed through said slot into said grooves to couple said elements such that said ring reacts axial tension forces and said helices transmit torsional forces and axial compression forces, the relative rotation of said helices with respect to one another serving to load said locking ring axially to tighten said coupling, and wherein said locking ring has means permitting it to be withdrawn from said grooves through said slot such that said elements can be uncoupled.

3. A coupling for taking axial and torsional loads comprising: a first coupling element the end portion of which is received in the end portion of a second coupling element, a first helix in the end portion of said first element, a second helix in the end portion of said second element, said first helix being a mirror image of said second helix in their coupled configuration such that their contours match, each helix having an axially extending shank between the end of the helix at its lead and its point of origin, a first annular peripheral groove in the outside diameter of said first element end portion, a second annular peripheral groove in the inside diameter of said second element end portion, a slot through the wall of said second element providing access to said second groove, and a split locking ring having an outside diameter having a clearance fit with the diameter of the bottom of said second groove and a thickness less than the combined depths of said first and second grooves, wherein said first annular groove is overlain by said second annular groove such that said ring can be inserted through said slot into said grooves to couple said elements, and wherein a torsional load driving one of said elements in a direction advancing its helix causes the shank thereof to engage the shank of the helix of the driven element, the engagement of the shanks transmitting the torque load such that the elements rotate as one, and wherein a torsional load driving one of said elements in a direction retreating its helix causes said helix to ride up on the helix of the driven element, producing a camming action which causes an axial movement in a direction tending to separate said elements, said axial movement being resisted by said ring such that said elements are locked together so they rotate as one.

4. A coupling for taking axial and compressional loads comprising: a first coupling element the end portion of which is received in the end portion of a second coupling element, a peripheral annular shoulder in the end portion of said second element receiving said first element, the end of the first element end portion being formed into at least two helices, said shoulder being formed into at least two helices, each of said helices having a shank extending axially substantially one pitch to the line of origin from the point of greatest advance of said helix, a first annular peripheral groove in the outside diameter of said first element end portion, a second annular peripheral groove in the inside diameter of said second element end portion, said second groove substantially overlying said first groove when said first element is received in said second element with the respective helices of said elements in contact, a slot through the wall of said second element providing access to said grooves when said elements are assembled, and a split locking ring which is inserted through said slot into said grooves such that the assembled elements are retained together, whereby axial tension loads on said coupling are taken by said ring and torsional and axial compression loads are taken by said helices.

5. The coupling set forth in claim 4 wherein the elements are tubular elements.

6. The coupling set forth in claim 4 wherein the end of the split locking ring distal from its leading end is accessible through said slot when said ring is installed and wherein said distal end is provided with means enabling it to be grasped such that said ring can be withdrawn from the element grooves to allow said elements to be separated.

7. A coupling capable of taking axial and torsional loads comprising: a first coupling element the end portion of which is received in the end portion of a second coupling element, a first annular peripheral groove in the outside diameter of said first element end portion, a second annular peripheral groove in the inside diameter of said second element end portion, a slot through the wall of said second element providing access to said groove therein, and a split locking ring, said first annular groove being overlain by said second annular groove when said first element is received in said second element whereby said ring can be inserted through said slot into said grooves to couple said elements, and means for removing the slack resulting from manufacturing tolerances in said coupling, and wherein the means for removing the slack in said coupling consists of a helix formed in the end portion of the first element engaging a helix formed in the end portion of the second element whereby a twisting of one element relative to the other causes one helix to ride upon up on the other helix to produce an axial separation of the elements, which relative axial movement of said elements removes the slack between the sides of the walls of the grooves therein and said ring such that the coupling is tightened, whereby taking up the coupling clearances enhances the rigidity in bending of the structure.

8. The coupling set forth in claim 7 wherein the helix in the first element is a mirror image in the coupled position of the helix in the second element.

9. A coupling capable of taking axial and torsional loads comprising: a first tubular element having an end portion which is a sliding fit into a section of enlarged diameter in the end of a second tubular element, the edge of said end portion of said first element being formed into a first helix, a peripheral shoulder at the transition region between the enlarged and normal diameters in the bore of said second element, said shoulder being formed into a second helix matching said first helix, each helix having an axially extending shank between the end of the helix at the lead and its point of origin, a first peripheral annular groove in the outer diameter of said first element proximate the end thereof, a second peripheral annular groove in said enlarged diameter of said second element, said second groove substantially overlying said first groove when said first element is received in said second element with said helices in contact with one another, a slot in said second element through the wall thereof providing access to said grooves when said elements are assembled, and a split locking ring which is fed through said slot into said grooves such that said elements are retained together, whereby axial loads on said coupling are taken by said ring and torsional loads are transmitted by said helices.

* * * * *